United States Patent
Lamb et al.

(10) Patent No.: US 12,231,257 B2
(45) Date of Patent: Feb. 18, 2025

(54) SYSTEM, METHOD AND APPARATUS FOR PROPAGATING A PRIMARY ALERT OF A MONITORING SYSTEM OR DEVICE

(71) Applicant: ECOLINK INTELLIGENT TECHNOLOGY, INC., Carlsbad, CA (US)

(72) Inventors: Michael Lamb, Rancho Santa Fe, CA (US); Paul D. Arling, Scottsdale, AZ (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 365 days.

(21) Appl. No.: 17/743,079

(22) Filed: May 12, 2022

(65) Prior Publication Data

US 2023/0370302 A1    Nov. 16, 2023

(51) Int. Cl.
*H04L 12/28* (2006.01)
*G08B 21/02* (2006.01)

(52) U.S. Cl.
CPC ............ *H04L 12/282* (2013.01); *G08B 21/02* (2013.01); *H04L 2012/2843* (2013.01)

(58) Field of Classification Search
CPC ........ H04L 12/2823; H04L 2012/2843; G08B 21/02; G08B 27/008; H04H 20/59; H04N 21/4882
See application file for complete search history.

(56) References Cited

U.S. PATENT DOCUMENTS

| | | | |
|---|---|---|---|
| 2006/0017558 A1* | 1/2006 | Albert | G08B 3/10 340/521 |
| 2006/0087428 A1 | 4/2006 | Wolfe | |
| 2008/0129821 A1* | 6/2008 | Howarter | H04N 7/181 348/E7.086 |
| 2011/0030016 A1* | 2/2011 | Pino, Jr. | H04N 21/25875 386/E5.069 |
| 2013/0125177 A1 | 5/2013 | Pino | |
| 2017/0006348 A1* | 1/2017 | Hardt | G08B 13/196 |
| 2017/0064412 A1* | 3/2017 | Taxier | H04L 67/12 |
| 2022/0327914 A1* | 10/2022 | Putterman | G08B 27/006 |

OTHER PUBLICATIONS

International Search Report and Written Opinion of international application No. PCT/US2023/066831, mailed Aug. 24, 2023, 21 pp.

* cited by examiner

*Primary Examiner* — Mong-Shune Chung
(74) *Attorney, Agent, or Firm* — Greenberg Traurig, LLP

(57) ABSTRACT

Systems, methods and apparatus are described for propagating a primary alert from a premises monitoring system or device by a home entertainment device. A premises monitoring system or device, such as a security system, smoke detector, fire detector, carbon monoxide detector, baby monitor, smart speaker, etc., emit a primary alert when a predetermined event or condition occurs associated with a monitored premises. An indication of the primary alert is received by one or more home entertainment devices, and at least one of the home entertainment devices causes a secondary alert to occur, for example, an audio notification and/or a visual notification from the at least one home entertainment device.

14 Claims, 3 Drawing Sheets

SYSTEM, METHOD AND APPARATUS FOR PROPAGATING A PRIMARY ALERT OF A MONITORING SYSTEM OR DEVICE

BACKGROUND

I. Field of Use

The present application relates to the field of home and business monitoring systems and devices, such as security systems, home automation/monitoring systems, fire/smoke detection systems, carbon monoxide detection systems, home smart speakers, etc. More specifically, the present application relates to systems, apparatus and methods for propagating a primary security alert generated by such a home or business monitoring system or device.

II. Description of the Related Art

Premises monitoring systems and devices for homes and businesses may take many forms. For example, a home security system may monitor a premises to determine unauthorized entry through doors and windows, glass breakage, and motion. A home automation/monitoring system may comprise a consumer-grade central device in communication with a plurality of peripheral sensors and actuators, for detecting certain conditions in a home and performing certain predetermined actions. For example, a Samsung Smartthings hub may automatically detect occupancy in a room of a premises, and in response, turn lights on. Also popular are so-called "smart speakers" such as Amazon's Echo and Google's Nest hub, which may act as a central security monitoring station in communication with a plurality of security sensors, as a smoke and/or fire detector, in communication with one or more smoke detectors, as a carbon monoxide monitoring device in communication with a carbon monoxide sensor, etc.

In any of the affirmation systems, "primary alerts" may be generated in response to detecting a certain condition associated with a premises being monitored. As used herein, a "primary alert" comprises a notification, such as a warning, announcement or notification, generated natively by a particular monitoring device or system. For example, a primary alert from a security system may comprise a loud, audible alarm from a security siren and/or a bright, flashing light from a security strobe light. In another example, a primary alert from smart speaker may comprise an audible alert or warning notification emitted directly from such a smart speaker when a smart speaker detects a certain condition associated with the premises, such as unauthorized intrusion or motion from a security sensor, detection of an audible alarm from a smoke detector, detection of glass breaking, etc.

One problem with such monitoring systems and devices is that the primary alerts may not be loud enough, or bright enough, to alert people to the occurrence of a particular event. This may be especially true if the premises being monitored is large. It may also be especially true in the case of smart speakers, which typically can only emit a notification within a limited range. Another problem with primary alerts is that they may easily be defeated, such as by destroying devices that emit the primary alerts, such as destroying a smart speaker, security siren or security strobe light.

Yet still another problem with some primary alerts is that they may be too intense if false alarms occur. For example, a local security siren may badly startle occupants of a home if one of the occupants opens a door or window that is monitored by an armed security system.

Yet still another problem with prior art security systems, especially legacy systems, is that they may not have inability to remotely contact authorized persons when an intrusion occurs. This feature may be found on modern-day security systems, but for millions of legacy systems in existence, it would be desirable to have this feature.

Thus, it would be desirable to enhance such monitoring devices and systems in order to better alert interested parties of events that occur in association with a premises.

SUMMARY

The embodiments described herein relate to methods, systems, and apparatus for propagating a primary alert from a monitoring system or device. In one embodiment, a method is performed by a home entertainment device for propagating a primary alert from a premises monitoring system or device, comprising receiving a signal from the premises monitoring system or device, determining that the signal comprises a primary alert notification, the primary alert notification comprising an indication of an occurrence of an event associated with a premises being monitored by the premises monitoring system or device, and in response to determining that the signal comprises a primary alert notification, causing a secondary alert to occur.

In another embodiment, a home entertainment device is described, for promulgating a primary alert from a premises monitoring system or device, comprising a monitoring system or device interface, a non-transitory information storage device for storing processor-executable instructions, a transducer, and a processor, coupled to the monitoring system or device interface, the non-transitory information storage device and the transducer, the processor for executing the processor-executable instructions that causes the processor to receive, via the monitoring system or device interface, a signal from the premises monitoring system or device, determine that the signal comprises the primary alert notification, the primary alert notification comprising an indication of an occurrence of an event associated with a premises being monitored by the premises monitoring system or device and in response to determining that the signal comprises a primary alert notification, cause a secondary alert to occur.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to systems, methods and apparatus for propagating a primary alert of a premises monitoring system or device. A "primary alert" comprises a notification, such as a warning, announcement or notification, generated natively by a particular premises monitoring device or system. In one embodiment, a primary alert is emitted by a premises monitoring system or device when a predetermined event occurs in association with the premises. The premises monitoring system or device may additionally generate a primary alert notification and provide the primary alert notification to one or more home entertainment devices within the same premises. The one or more home entertainment devices propagate the primary alert by causing a "secondary alert" to occur, i.e., causing a visual and/or audible alert to be emitted from the home entertainment device in addition to the primary alert being emitted by the premises monitoring system or device. In another embodiment, the home entertainment device propagates the primary alert from the premises monitoring system or device by causing one or more other home entertainment devices within the same premises to emit the secondary alert. In yet another embodiment, the primary alert from the premises monitoring system or device is received by an electronic device within the premises that is not a home entertainment device. In this embodiment, for example, an intermediary device, such as a dedicated electronic device, or a "dongle" coupled to a home entertainment device, could be configured to receive the primary alert notification from the premises monitoring system or device and, in response, cause the secondary alert to be emitted by one or more of the home entertainment devices, by sending a secondary alert notification to the one or more home entertainment devices.

Embodiments of the present invention improve prior art premises monitoring systems and devices, because they overcome some of the shortcomings of such prior art systems and devices. Specifically, embodiments of the present invention allows such monitoring systems and devices to better notify authorized persons of events or conditions occurring in association with a monitored premises, without having to purchase additional hardware.

Figure 1:
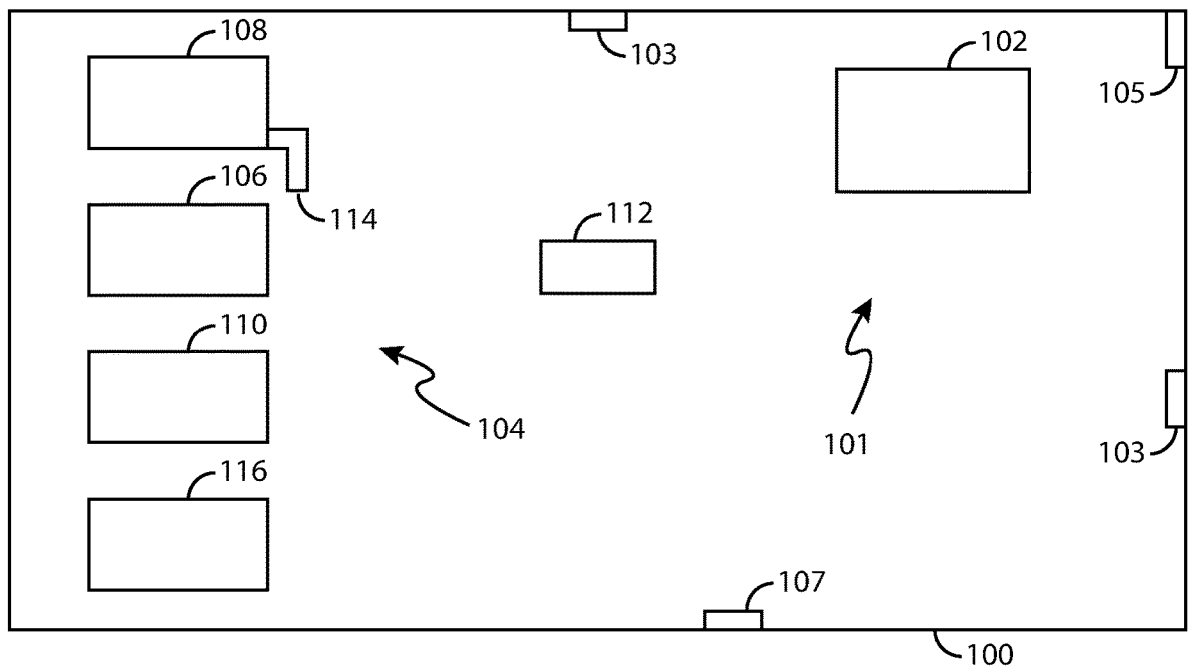
FIG. 1 is a block diagram illustrating one embodiment of a premises being monitored by a premises monitoring system or device, a plurality of home entertainment devices and two electronic devices for promulgating a primary alert from the premises monitoring system or device.

FIG. 1 is a block diagram illustrating one embodiment of a premises 100, such as a home or a business, being monitored by a premises monitoring system or device 101. The premises monitoring system or device 101 comprises a central monitoring device 102, such as a security panel, an Internet-connected home automation/monitoring hub or gateway (such as a SmarThings hub) for monitoring a number of sensors 103 distributed throughout premises 100, such as door and window sensors on at least some of the doors and windows of premises 100, one or more motion detectors, one or more smoke detectors, one or more fire detectors, one or more carbon monoxide detectors, one or more glass break sensors, etc., to detect events that occur in association with premises 100 such as unauthorized entry or motion when premises monitoring system or device 101 is in an armed-home or armed-away state (i.e., central monitoring device 102 will cause a primary alert to occur when it receives signals from security sensors indicating an intrusion into premises 100), the presence of smoke and/or fire, the sound of a smoke detector sounding, the sound of a baby crying, motion, occupancy, etc. Premises monitoring system or device 101 may alternatively comprise a stand-alone electronic device such as a smart speaker, smoke detector, fire detector, carbon monoxide detector that may monitor premises 100 via audible or visual stimuli in proximity to such a stand-alone device. For example, an Amazon Echo may listen for the sound of glass breaking, indicating an unauthorized entry into premises 100. A smoke or fire detector may monitor premises 100 for the presence of fire or smoke. A carbon monoxide detector may monitor premises 104 the presence of carbon monoxide. When such a stand-alone device detects a predetermined event or condition associated with premises 100, it may emit a loud, audible notification and/or cause a notification message to be displayed on a display screen of the stand-alone device. In these cases of such stand-alone devices, reference herein may be made to such a device as premises monitoring system or device 101 or central monitoring device 102.

In any case, when a predefined event or condition occurs in association with premises 100, central monitoring device 102 may cause a primary alert to occur, for example, in the form of causing one or more loud sirens 105 to sound inside or outside premises 100, causing one or more bright strobe lights 107 to flash inside or outside premises 100, and/or notifying authorized persons associated with premises 100 that the predefined event has occurred. Additionally, the primary alert may comprise central monitoring device 102 sending an alert to a remote monitoring station (not shown) via the Internet, phone lines, cellular network, etc., to report the event. In any case, primary alert is generally emitted natively, i.e., by the same system or device that detected the event or condition.

When a primary alert is emitted by premises monitoring system or device 101, it additionally causes one or more non-native devices to propagate the primary alert by causing one or more "secondary alerts" to occur, in order to ensure that persons within premises 100 are alerted to the event or condition associated with premises 100. This may be particularly helpful in a situation where everyone inside premises 100 is sleeping, or if a siren or strobe light has been disabled by an intruder. Secondary alerts are emitted by, for example, one or more home entertainment devices 104, such as set top box 106, television 108, stereo 110 and/or smart speaker 116 (i.e., an Amazon Echo, a Google Home smart speaker, etc.), It should be understood that in some embodiments, a smart speaker can be used as premises monitoring system or device 101, central monitoring device 102 or it can be used to emit a secondary alert. In some embodiments, a first smart speaker may be used as premises monitoring system or device 101 and a second smart speaker may be used to emit a secondary alert, and in some embodiments, vice-versa.

In one embodiment, when a predetermined event or condition occurs associated with premises 100, premises monitoring system or device 101 may generate a primary alert notification in the form of an electronic message indicating that a predefined event or condition associated with premises 100 has occurred. The electronic message may comprise a command to cause the primary alert to occur, or it may comprise a command specifically tailored for receipt by one or more home entertainment devices 104, and/or electronic devices 112 or 114. In another embodiment, a primary alert itself, such as audible sounds and/or visual alerts, may serve as the primary alert notification in embodiments where one or more home entertainment devices 104, and/or electronic devices 112 or 114, are capable of sensing such audible and/or visual alerts. For example, one or more home entertainment devices 104, and/or electronic devices 112 or 114 may comprise a microphone for receiving audible alerts, warnings or notifications from premises monitoring system or device 101, where the audible alerts, warnings or notifications act as primary alert notifications.

In one embodiment, one or more of the home entertainment devices 104 may comprise circuitry and firmware configured to receive primary alert notifications, either electronically (i.e., from central monitoring device 102), audibly (i.e., from a security siren, smoke detector, smart speaker, etc.) and/or visibly (i.e., from a security strobe light, display screen of a smart speaker, etc.). When one or more of the home entertainment devices 104 receives a primary alert notification, each home entertainment device 104 that receives the primary alert notification may cause a secondary alert to occur. For example, if television 108 receives a primary alert notification wirelessly from central monitoring device 102, television 108 may place itself in an active state from a quiescent state, i.e., turn itself on if television 108 was in an off or standby state, and emit one or more sounds from television 108 at an elevated volume level, and/or causing a display screen of television 108 to flash a bright white screen on and off, simulating a security strobe light.

In another embodiment, a home entertainment device 104 that receives a primary alert notification may cause one or more other home entertainment devices 104 to emit a secondary alert. For example, if set top box 106 receives a primary alert notification wirelessly from central monitoring device 102 or from a stand-alone monitoring device, set top box 106 may cause stereo 110 and television 108 both to be powered on and to each play a prerecorded audio file provided by home entertainment device 104 or by premises monitoring system or device 101 at a high volume in order to attract attention a, In the case of television 108, additionally cause a bright, flickering display to attract attention as well.

In yet still another embodiment, an intermediary electronic device 112 and/or 114 in premises 100 that is not a home entertainment device 104 may receive a primary alert notification from premises monitoring system or device 11. In this embodiment, electronic device 112 or 114 may comprise a dedicated electronic device functioning as an intermediary between premises monitoring system or device 101 and one or more home entertainment devices 104. In one embodiment, electronic device 114 may comprise a "dongle" that is capable of being removably connected to one or more of the home entertainment devices 104. For example, electronic device 114 may be inserted into an HDMI, USB or ethernet port of television 108, stereo 110, etc.

When a primary alert notification is received by electronic device 112 or 114, it generates a secondary alert notification and provides it to one or more of the home entertainment devices 104, either directly or wirelessly. When the secondary alert notification is received by one or more of the home entertainment devices 104, each home entertainment device 104 that received the secondary alert notification may emit a secondary alert, for example, in the form of an audio and/or visual alert. The secondary alert may be the same, or different, from the primary alert emitted by premises monitoring system or device 101.

In any of the embodiments described above, the secondary alert may be canceled when premises monitoring system or device 101 indicates that the primary alert has been canceled, i.e., an authorized user has indicated to premises monitoring system or device 101 that the primary alert should be canceled. In this case, a cancel command may be generated by premises monitoring system or device 101 and received by one or more of the home entertainment devices 104 and/or intermediary devices 112 and/or 114. In response, the one or more of the home entertainment devices 104 and/or intermediary devices 112 and/or 114 that received the cancel command causes one or more home entertainment devices 104 to stop emitting the secondary alert, and may further cause one or more home entertainment devices 104 to be powered off or enter new into a quiescent state.

Figure 2:
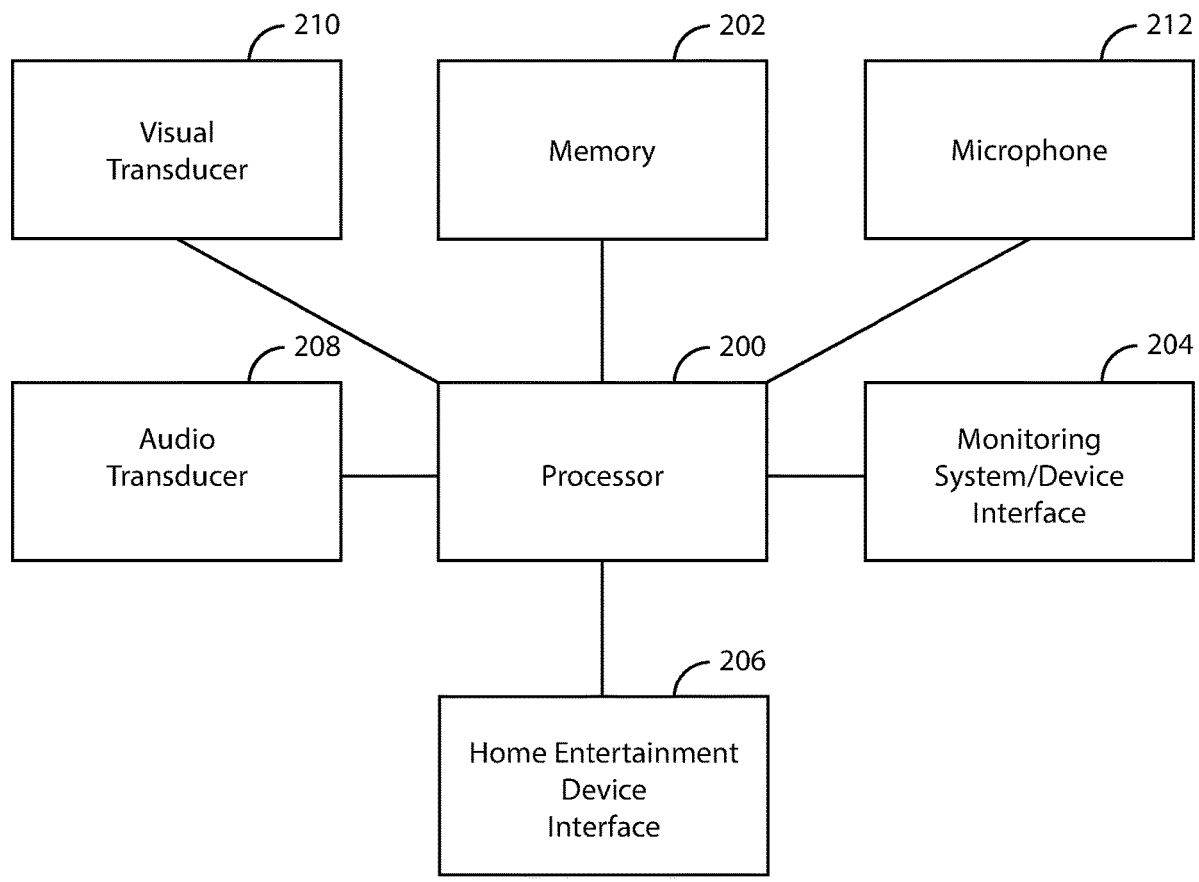
FIG. 2 is a functional block diagram of one embodiment of one of the home entertainment devices as shown in FIG. 1, or either of the electronic devices, also shown in FIG. 1.

FIG. 2 is a functional block diagram of one embodiment of a portion of one of the home entertainment devices 104, or electronic device 112 or 114. Specifically, FIG. 2 shows processor 200, memory 202, monitoring system or device interface 204, home entertainment device interface 206, audio transducer 208, visual transducer 210 and microphone 212. It should be understood that the functional blocks may be coupled to one another in a variety of ways, and that not all functional blocks necessary for promulgating primary alerts from a monitoring system are shown (such as a power supply), for purposes of clarity. Further, it should be understood that some of the functional components shown in FIG. 2 may not be present in some embodiments. For example, neither electronic device 112 or 114 typically comprises audio transducer 208 or visual transducer 210.

Processor 200 may comprise one or more digital computing devices configured to provide general operation of at least a portion of a home entertainment device 104, or electronic device 112 or 114, by executing processor-executable instructions stored in memory 202, for example, executable code. Processor 200 typically comprises a general-purpose processor, such as an Intel Atom processor, although any one of a variety of microprocessors, microcomputers, and/or microcontrollers may be used alternatively. Processor 200 may be considered to be a specialized processor when it is programmed with the executable-instructions stored in memory 202. Processor 200 is typically selected based on processing power, size and cost.

Memory 202 is electronically coupled to processor 200, comprising one or more non-transitory information storage devices, such as RAM, ROM, EEPROM, flash, SD, XD, or other type of electronic, optical, or mechanical memory device. Memory 202 is used to store processor-executable instructions for at least a portion of the operations of a home entertainment device 104 or electronic device 112 or 114, as well as any information used by processor 200, such as identification information of one or more home entertainment devices 104 and central monitoring device 102, one or more secondary alerts, such as electronic representations of audible and/or visual stimulus intended to alert persons inside premises 102 to the presence of a primary alert and/or a second security alert. In some embodiments, at least a portion of memory 202 may be embedded into processor 200.

Monitoring system or device interface 204 is coupled to processor 200, comprising hardware and, in some embodiments, firmware, necessary for a home entertainment device 104, or electronic device 112 or 114 to receive electronic primary alert notifications from premises monitoring system or device 11, audible primary alert notifications from a security siren, smart speaker, etc., and/or visual primary alert notifications from a security strobe, smart speaker display screen, lights, etc. Monitoring system or device interface 204 may comprise a wireless receiver configured for operation in one or more well-known, consumer-grade, wireless protocols, such as Wi-Fi, Zwave, Zigbee, RF4CE, HDMI, etc., or one or more well-known, consumer-grade wired hardware interfaces, such as an ethernet port. For receiving audible primary alert notifications, monitoring system or device interface 204 may comprise one or more microphones, amplification circuitry, filters, and/or firmware to convert audible sounds from by the one or more microphones into electronic waveforms for evaluation by processor 200 to determine if such audible sounds represent a primary alert notification, such as a security siren sounding. Such circuitry is well-known in the art. Finally, monitoring system or device interface 204 may comprise a light sensor or camera and related hardware for receiving light inside premises 100 and for converting the light into electronic signals for evaluation by processor 200 to determine if such light represents a primary alert notification in the form of, for example, a security strobe light flashing. Again, such circuitry is well known in the art.

Home entertainment device interface 206 is used in embodiments utilizing electronic devices 112 or 114, where home entertainment device interface 206 is coupled to processor 200, comprising hardware and, in some embodiments, firmware, necessary for an electronic device 112 or 114 to provide secondary alerts to one or more home entertainment devices 104 via wireless or wired means. For example, home entertainment device interface 204 may comprise a wireless transmitter configured in accordance with one or more well-known, consumer-grade, wireless protocols, such as Wi-Fi, Zwave, Zigbee, RF4CE, etc., or home entertainment device interface 206 may comprise one or more well-known, consumer-grade wired hardware interfaces, such as an ethernet port or HDMI port. Typically, a wireless transmitter is used in electronic device 112, while a hardware interface is typically used in electronic device 114. In any case, such technology is well-known in the art.

Audio transducer 208 is coupled to processor 200, comprising circuitry necessary for home entertainment device 104 to emit a secondary alert in the form of one or more loud, audible sounds. Such circuitry typically comprises an audio amplifier and speaker. Processor 200 may provide one or more pre-recorded, electronic signals representative of the one or more loud, audible sounds to audio transducer 208, for example, a pre-recorded electronic signal representing the sound of a security siren, a pre-recorded human voice notifying occupants of premises 100 of an intrusion, etc. Audio transducer 208 then amplifies such signals and converts them to audible sounds via the speaker. Such circuitry is well known in the art.

Visual transducer 210 is coupled to processor 200, comprising circuitry necessary for home entertainment device 104 to emit a secondary alert in the form of one or more visual presentations. Visual transducer 210 may comprise a display screen of a television, a display screen of a mobile computing device such as a tablet computer, wearable electronic device, a display screen of a home digital assistant, etc.

Microphone 212 is coupled to processor 200, comprising circuitry for converting sound pressure waves caused by audible sounds into electronic signals for processing by processor 200. Such circuitry is well-known in the art.

Figure 3:
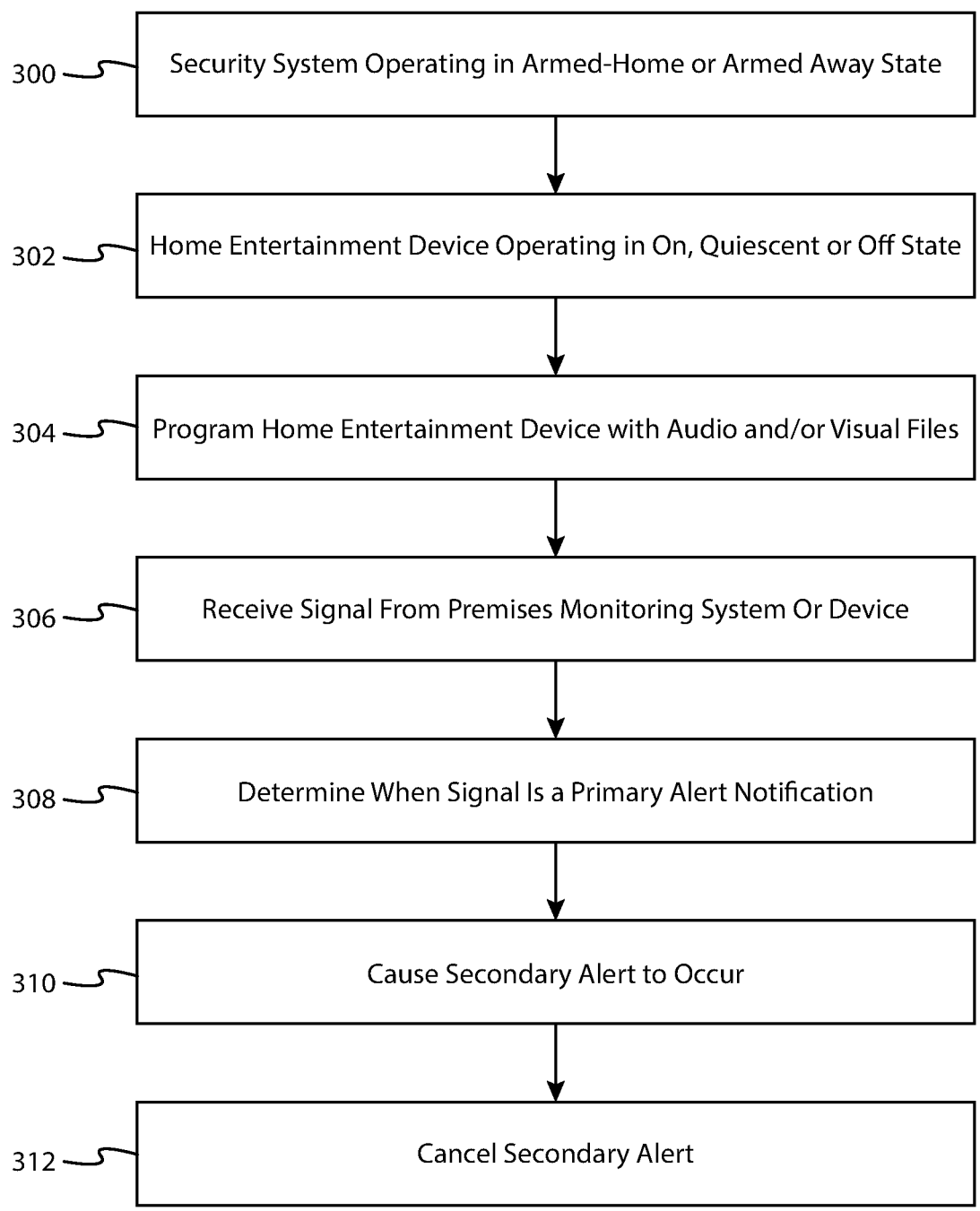
FIG. 3 is a flow diagram illustrating one embodiment of a method performed by one or more of the home entertainment devices as shown in FIG. 1, or by an electronic device, also shown in FIG. 1.

FIG. 3 is a flow diagram illustrating one embodiment of a method performed by one or more of the home entertainment devices, or electronic device 112 or 114, for promulgating a primary alert from a monitoring system. It should be understood that in some embodiments, not all of the steps shown in FIG. 3 are performed. It should also be understood that the order in which the steps are carried out may be different in other embodiments.

At block 300, in an embodiment where premises monitoring system or device 101 comprises a home security system, central monitoring device 102 is operating in an armed-home mode of operation or an armed-away mode of operation. In the armed-home mode of operation, central monitoring device 102 generates a primary alert, via one or more security sirens 105 and/or one or more security strobe lights 107 and/or transmitting an alert to one or more authorized persons for receipt by the one or more authorized persons, for example, on a mobile device such as a cell phone, wearable, etc., when an intrusion signal is received from any perimeter sensors, such as any door or window sensor. Any motion signals from motion detectors inside premises 100 are ignored in the armed-home mode. This allows an authorized person to move freely inside premises 100 without causing a primary alert to occur. In the armed-away mode of operation, central monitoring device 102 generates a primary alert when any security sensor is triggered. This mode of operation is used when all authorized persons of a premises or away.

At block 302, home entertainment device 104 may be operating either in an active state, a quiescent state, or in an off state. In the active state, home entertainment device 104 provides audio and/or visual entertainment to authorized persons inside premises 100. For example, if home entertainment device 104 is a television, the television may provide content in the form of movies and/or television shows to authorized persons. If home entertainment device 104 is a stereo, the stereo may provide music and/or audio content from one or more sources, such as the Internet, television 108, etc. In the quiescent state, home entertainment device 104 appears to be in and off state by authorized persons, but in actuality, home entertainment device 104 remains partially active, i.e., to maintain firmware in a particular state so that home entertainment device 104 may be quickly switched to the active state and/or powering at least premises monitoring system or device interface 204 in order to receive primary alert notifications from premises monitoring system or device 11. In the off state, home entertainment device 104 may be completely powered down.

At block 304, one of more of home entertainment devices 104 and/or electronic devices 112 or 114 may be preprogrammed with one or more audio files or visual pattern files and stored in memory 202. The one or more audio files comprise prerecorded digitized sounds, such as the sound of a security siren wailing, a human voice shouting instructions or warnings, or some other audible notification or warning. The one or more visual pattern files comprise digitized renderings and/or processor-executable instructions that causes a display screen of one or more of the home entertainment devices and/or electronic devices 112 or 114 to display visual information. For example, the one or more visual pattern files may cause one of the home entertainment devices 104 to rapidly alternate between displaying a black and a white screen, simulating a security strobe light. The one or more visual pattern files may convey certain information, such as a visual message that the police have been summoned, that a fire department has been summoned, or the nature of the primary alert notification, such as a visual message that the primary alert notification was issued due to a security breach and, in some embodiments, an identification of a particular security sensor that was breached, that the primary alert notification was issued due to a detection of smoke or fire, etc.

At block 306, processor 200 receives a primary alert notification from premises monitoring system or device 101 via monitoring system or device interface 204. The primary alert notification may comprise one of many different possibilities. For example, in a security system, a primary alert notification may comprise a command generated by central monitoring device 102 for one or more security sirens 105 to sound and/or for one or more security strobe lights 107 to flash. The same command may be transmitted and received by one or more of the home entertainment devices 104 and/or electronic devices 112 or 114. In another embodiment, the primary alert notification may comprise an audible siren emitted from security siren 105. In this embodiment, the sound emitted by security siren 105 is detected by microphone 212 of one or more of the home entertainment devices 104 and/or electronic device 112 or 114. In another embodiment, the primary alert notification may comprise a command specifically generated for receipt by one or more of the home entertainment devices 104 and/or electronic devices 112 or 114. In another embodiment, the primary alert notification comprises an electronic message that is sent to a remote monitoring center, indicative of an on authorized entry or movement. In this embodiment, the primary alert notification may comprise an electronic message formatted in accordance with a wide-area data network, such as the Internet, or it may be formatted in accordance with one or more wire-based telephone networks (i.e., a PSTN network, or a POTS network), and/or one or more wireless cellular communication networks (i.e., LTE, 5G, etc.). In one embodiment, in the case of the electronic message being formatted in accordance with a wide-area data network, processor 200 may, in addition to sending the electronic message to the remote monitoring center, send a second electronic message formatted in accordance with a local-area data network, such as a Wi-Fi network, addressed to one or more of the home entertainment devices 104, electronic device 112 and/or 114. More generally, the primary alert notification may be issued by a premises monitoring system or device 101 when it detects that a predetermined event or condition associated with premises 100 has occurred, where one or more of the home entertainment devices 104 and/or electronic devices 112 or 114 are configured to receive the primary notification alert.

At block 308, processor 200 determines whether the signal comprises a primary alert notification. Processor 200 may determine that the signal comprises a primary alert notification when data represented by the notification indicates that an event or condition has occurred in association with premises 100, such as unauthorized intrusion into premises 100, unauthorized motion inside premises 100, the presence of fire, the presence of smoke, the presence of carbon monoxide, a baby crying, etc., has occurred.

At block 310, in response to determining that the signal comprises a primary alert notification, processor 200 causes a secondary alert to occur.

In one embodiment, processor 200 may cause home entertainment device 104 to enter an active state of operation from either an off state or a quiescent state. For example, when processor 200 is part of home entertainment device 104, processor 200 generates one or more activation signals that are received by other circuitry of home entertainment device 104, such as an audio amplification circuit, a visual display, etc., to become energized so that home entertainment device 104 may present a secondary alert. When processor 200 is part of electronic device 114, the one or more activation signals are provided to home entertainment device interface 206, where they are received directly by home entertainment device 104 and, in response, circuitry internal to home entertainment device 104 becomes activated. In the case of processor 200 being part of electronic device 112, the one or more activation signals are provided to home entertainment device interface 206 where it is transmitted, typically wirelessly, to one or more of the home entertainment devices 104 and, in response, circuitry internal to one or more home entertainment devices 104 becomes activated. The one or more activation signals may, in some embodiments, be considered to be part of a secondary alert notification.

In some embodiments, in response to determining that the signal comprises a primary alert notification, processor 200 may generate a command that causes one or more home entertainment devices 1042 adjust a volume level of audio transducer 208. For example, when processor 200 is part of electronic device 112, electronic device 112 transmits a command to smart speaker 116, instructing smart speaker 116 to adjust its output volume to a maximum volume. The command, in this case, may comprise a wireless transmission via home entertainment device interface 206, or a recorded or computer-generated simulation of a human voice emitted by audio transducer 208, instructing smart speaker 116 to adjust its output volume to a maximum volume.

In one embodiment, in response to receipt of the primary alert notification, processor 200 may select a particular secondary alert to emit, based on a type of primary alert indicated by the primary alert notification. In this embodiment, premises monitoring system or device 101 provides an indication in the primary alert notification, identifying a particular type of intrusion or other event or condition that caused the primary alert to occur. For example, the primary alert notification may indicate that an unauthorized intrusion occurred, that smoke or fire has been detected, that unsafe levels of carbon monoxide has been detected, etc., and an identification of a particular sensor that sensed the activity or condition. Based on the type of primary alert, processor 200 may select a particular secondary alert. For example, when an unauthorized intrusion is indicated by the primary alert notification, processor 200 may select an audio file stored in memory 202 of a security siren sounding and a visual file stored in memory 202 representative of a flashing security strobe light. As another example, when the primary alert notification indicates that a water leak has been detected, processor 200 may select an audio file that causes home entertainment device 1042 emit a sound of a human voice indicating that a water leak has been detected, and, in some embodiments, an indication of which particular moisture sensor detected the condition. Of course, many other kinds of events or conditions may be associated by processor 200 with particular ones of audio and/or visual files.

After one or more of the home entertainment devices 104 has been placed into the active state of operation, or if the one or more home entertainment devices 104 were already in an active state, in one embodiment, processor 200 generates a secondary alert notification and provides the secondary alert notification to audio transducer 208 and/or visual transducer 210. In the case where processor 200 is part of home entertainment device 104, the secondary alert notification is provided internally to other circuitry, for example, audio transducer 208 and/or visual transducer 210. In another embodiment, where processor 200 is part of home entertainment device 104, processor 200 may generate a secondary alert notification and provide it to a second home entertainment device 104 via home entertainment device interface 206. For example, if processor 200 is part of set top box 106, processor 200 may provide the secondary alert notification to television 108 and television 108 may emit a secondary alert, i.e. emit an audible sound from its speakers and/or cause a display screen of television 108 to alternate between showing a black and a white screen, mimicking a security strobe light. In the case where processor 200 is part of electronic device 112 or 114, the secondary alert notification is provided to home entertainment device interface 206 where it is provided either directly, in the case of electronic device 114, or typically wirelessly, in the case of electronic device 112, to one or more of the home entertainment devices 104. Upon receipt and processing of the secondary alert notification, the one or more home entertainment devices 104 may emit the secondary alert, i.e. emit an audible sound from its speakers and/or cause a display screen of television 108 to display one or more predetermined images, or visual sequences, such alternation between displaying a black and a white screen, mimicking a security strobe light.

At block 312, the secondary alert may be canceled when premises monitoring system or device 101 indicates that the primary alert has been canceled, i.e., an authorized user has indicated to premises monitoring system or device 101 that the primary alert should be canceled. In this case, a cancel command may be generated by premises monitoring system or device 101 and received by one or more of the home entertainment devices 104 and/or intermediary devices 112 and/or 114 by processor 200 via premises monitoring system or device interface 204. In response, the one or more of the home entertainment devices 104 and/or intermediary devices 112 and/or 114 that received the cancel command causes one or more home entertainment devices 104 to stop emitting the secondary alert, and may further cause one or more home entertainment devices 104 to be powered off or enter new into a quiescent state. In some embodiments, for example in the case of a first home entertainment device 104 causing a second home entertainment device 1042 emit the secondary alert, or in the case of electronic device 112 or 114, the cancel command is received by processor 200 via premises monitoring system or device interface 204 and, in response, processor 200 generates a secondary cancel command that is provided to one or more of the home entertainment devices 104 via home entertainment device interface 206. When the one or more home entertainment devices 104 receives the secondary cancel command, each home entertainment device 104 that has been emitting the secondary alert stops emitting the secondary alert and, in some embodiments, enters into a quiescent or off state.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

The term "or", as in "at least one of A or B", means A or B, or both, unless otherwise noted.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method, performed by a first home entertainment device communicatively coupled to a second home entertainment device, for propagating a primary alert from a premises monitoring system or device, comprising:
   receiving a signal from the premises monitoring system or device;
   determining that the signal comprises a primary alert notification, the primary alert notification comprising an indication of an occurrence of an event associated with a premises being monitored by the premises monitoring system or device; and
   in response to determining that the signal comprises a primary alert notification, causing a second home entertainment device to enter an active state from a quiescent state and to emit a secondary alert.

2. The method of claim 1, wherein the secondary alert comprises at least one of an audible alert and a visual alert.

3. The method of claim 1, wherein the primary alert notification comprises an audible alert from the monitoring system, and determining that the signal comprises the primary alert comprises:
   converting the audible alert into an electronic signal; and
   processing the electronic signal to determine whether the electronic signal is indicative of the primary alert notification.

4. The method of claim 1, further comprising:
   in response to determining that the signal comprises the primary alert notification, causing a mobile device communicatively coupled to the first home entertainment device to emit a further secondary alert notification for alerting an authorized person of the monitoring system of the primary alert.

5. The method of claim 1, wherein the home entertainment device comprises a television.

6. The method of claim 1, wherein the home entertainment device comprises a set top box.

7. The method of claim 1 further comprising:
   determining an event type of the event associated with a premises; and
   based on the event type, causing an audible or visual file to be selected as the secondary alert.

8. A first home entertainment device, comprising:
   a monitoring system or device interface;
   a non-transitory information storage device for storing processor-executable instructions;
   a transducer; and
   a processor, coupled to the monitoring system or device interface, the non-transitory information storage device and the transducer, the processor for executing the processor-executable instructions that causes the first home entertainment device to;
   receive, via the monitoring system or device interface, a signal from a premises monitoring system or device;
   determine that the signal comprises a primary alert notification, the primary alert notification comprising an indication of an occurrence of an event associated with a premises being monitored by the premises monitoring system or device; and in response to determining that the signal comprises a primary alert notification, cause a second home entertainment device communicatively coupled to the first home entertainment device to enter an active state from a quiescent state and to emit a secondary alert.

9. The first home entertainment device of claim 8, wherein the secondary alert comprises at least one of an audible alert and a visual alert.

10. The first home entertainment device of claim 8, wherein the signal from the monitoring system comprises an audible alert from the monitoring system, and the instructions for determining that the signal comprises the primary alert comprises instructions that cause the first home entertainment device to:

convert the audible alert into an electronic signal; and process the electronic signal to determine whether the electronic signal is indicative of the primary alert.

11. The first home entertainment device of claim 8, comprising further instructions that causes the first home entertainment device to:

in response to determining that the signal comprises the primary alert notification, cause a mobile device communicatively coupled to the first home entertainment device to emit a further secondary alert notification for alerting an authorized person of the monitoring system of the primary alert.

12. The first home entertainment device of claim 8, wherein the first home entertainment device comprises a television.

13. The first home entertainment device of claim 8, wherein the first home entertainment device comprises a set top box.

14. The first home entertainment device of claim 10, comprising further instructions that causes the first home entertainment device to:

determine an event type of the event associated with the premises; and based on the event type, select an audible or visual file for presentation as the secondary alert.

\* \* \* \* \*